(12) United States Patent
Lee et al.

(10) Patent No.: US 7,835,039 B2
(45) Date of Patent: Nov. 16, 2010

(54) IMAGE READING APPARATUS

(75) Inventors: Pen-Jung Lee, Hsin-Tien (TW); Chia-Wei Wang, Hsin-Tien (TW); Kun-Lin Tsai, Hsin-Tien (TW)

(73) Assignee: Creative Sensor Inc., Hsin-Tien (TW)

( * ) Notice: Subject to any disclaimer, the term of this patent is extended or adjusted under 35 U.S.C. 154(b) by 128 days.

(21) Appl. No.: 12/030,947

(22) Filed: Feb. 14, 2008

(65) Prior Publication Data

US 2008/0192306 A1    Aug. 14, 2008

(30) Foreign Application Priority Data

Feb. 14, 2007    (TW) .............................. 96105574 A (51) Int. Cl.
*H04N 1/04* (2006.01)
(52) U.S. Cl. ...................... 358/475; 358/474; 358/483; 358/484

(58) Field of Classification Search ................. 358/475, 358/474, 483, 482, 497, 512–514, 505, 484, 358/509; 250/208.1, 239, 234–236, 216; 355/67, 68; 382/312, 318, 319
See application file for complete search history.

(56) References Cited

FOREIGN PATENT DOCUMENTS

| CN | 1805493 | 7/2006 |
|---|---|---|
| JP | 2002006312 A * | 1/2002 |
| JP | 2007078916 | 3/2007 |

* cited by examiner

*Primary Examiner*—Cheukfan Lee
(74) *Attorney, Agent, or Firm*—Alan Kamrath; Kamrath & Associates PA (57) ABSTRACT

An image reading apparatus includes a housing, a rod lens array, a light module and a sensor board. The housing accommodates the rod lens array, the light module and the sensor board. The sensor board includes a plurality of light sensor chips. The light module includes a light guide, a light source and guide terminals extending from the light source. The guide terminals are electrically connected to the sensor board with resilient contacts.

17 Claims, 8 Drawing Sheets

IMAGE READING APPARATUS

BACKGROUND OF THE INVENTION

1. Field of the Invention

The present invention relates to an image reading apparatus and, more particularly, to an image reading apparatus for a contact image sensor module which is easy to disassemble, has low cost and is recyclable.

2. Description of the Related Art

Figure 1:
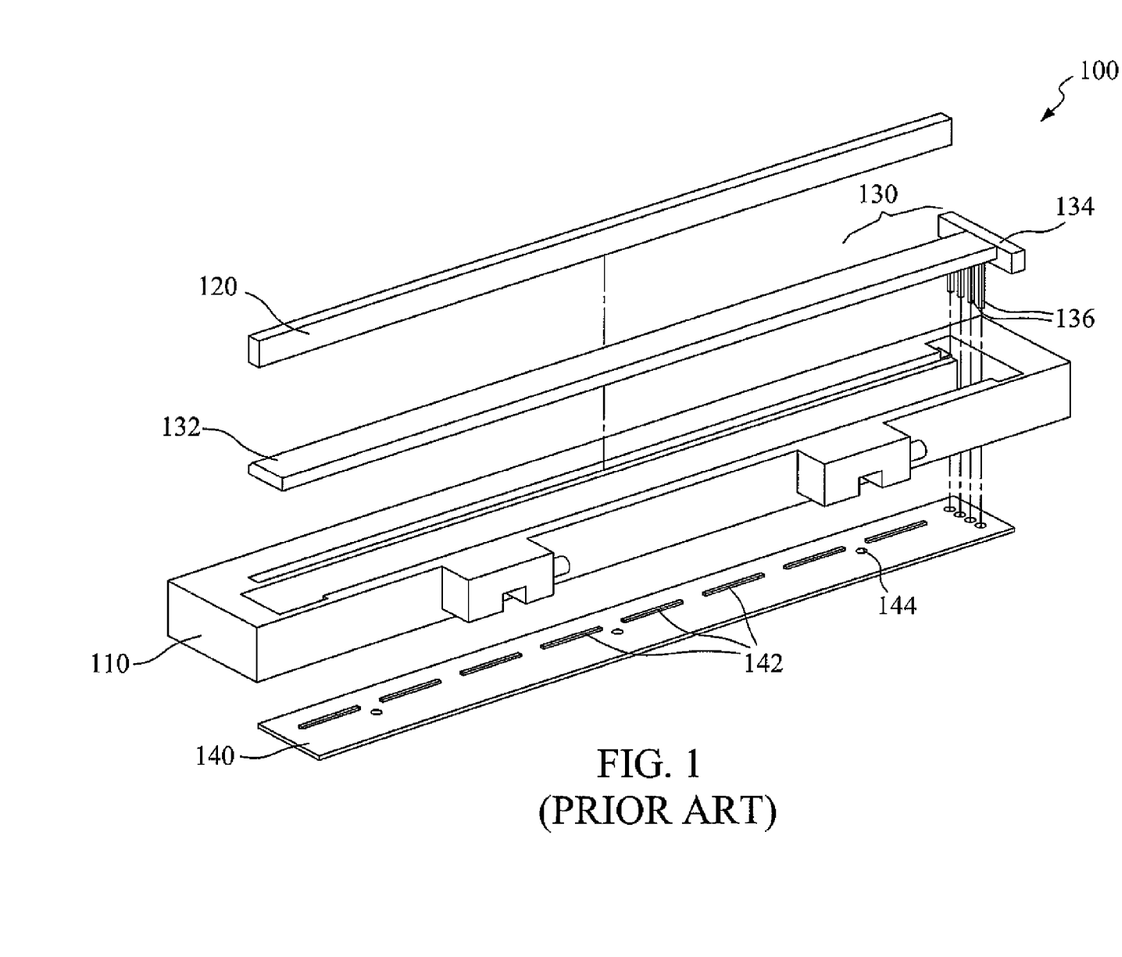
FIG. 1 is an exploded view of a prior art image reading apparatus.
Figure 2:
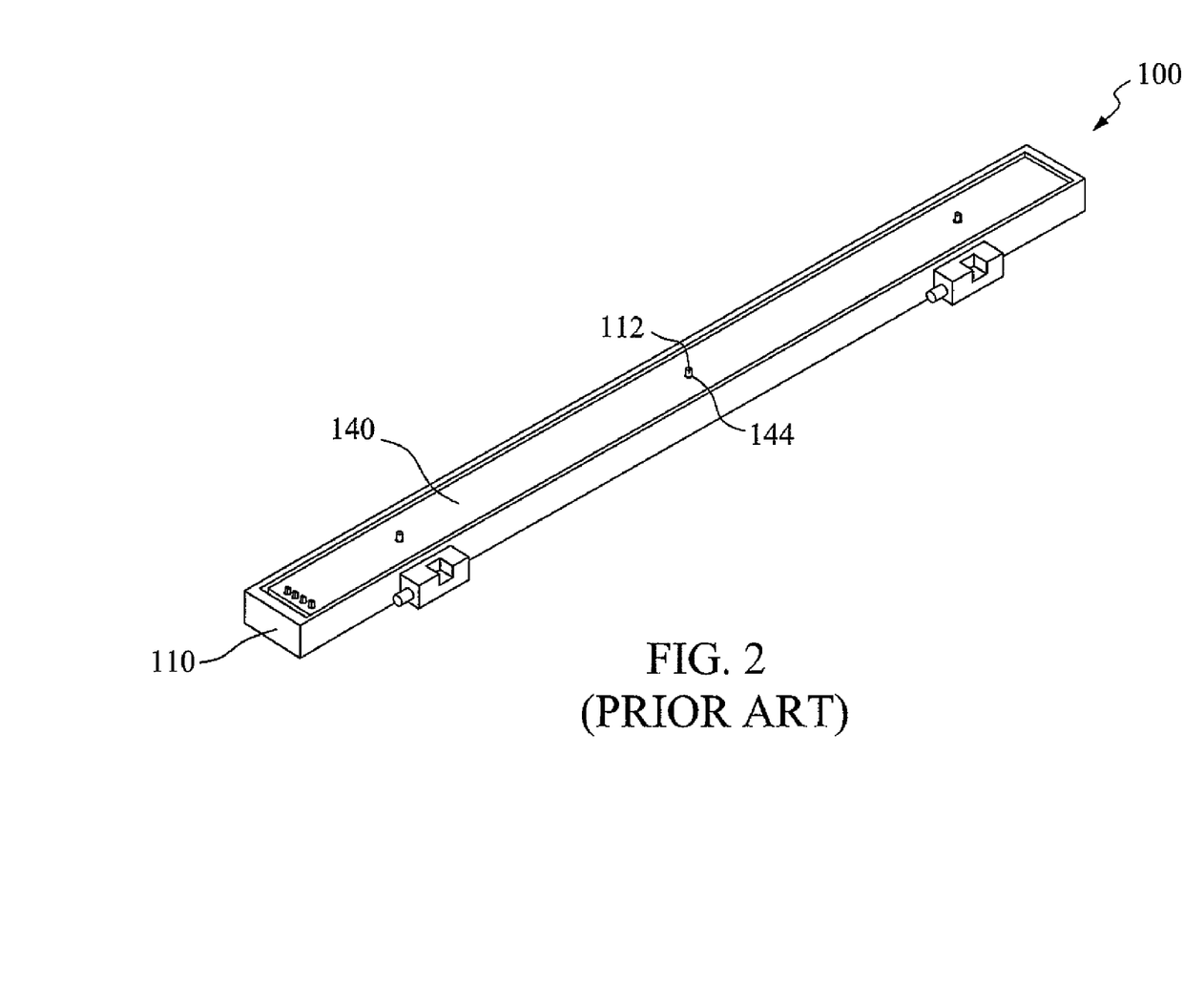
FIG. 2 is a rear assembling drawing of the prior art image reading apparatus.
Figure 3:
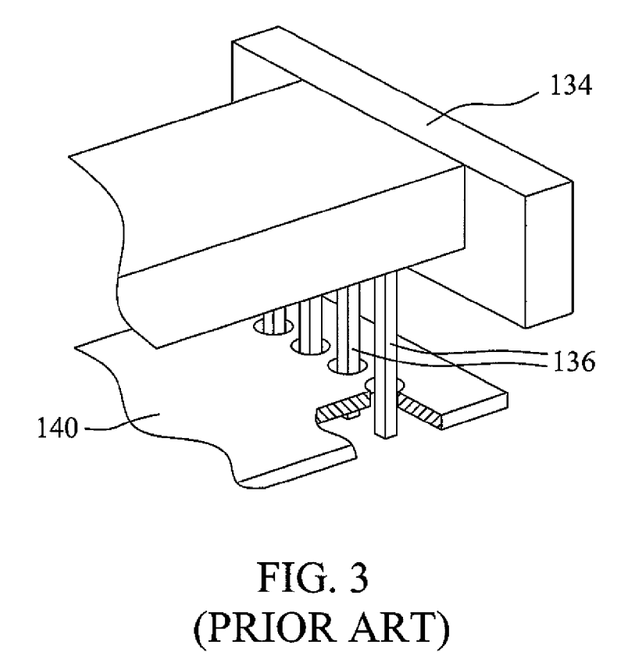
FIG. 3 is a schematic drawing of combining together a sensor board and light source guide terminals in the prior art image reading apparatus.

Contact image sensor modules (CISM) are typically found in standard or professional scanners, copying machines and fax machines and are used to read and output image data. As shown in FIG. 1, generally, the image reading apparatus 100 comprises a housing 110, a rod lens array 120, a light module 130 (including a light source 134, a light guide 132, light source guide terminals 136 and a white reflective housing) and a sensor board 140. In operation, it uses an edge lighting method to transform the light from the light source 134 into a stream light source via the light guide 132 and the white reflective housing outside of the light guide 132. The light is injected onto the scanned object, and reflected light passes through the rod lens array 120 for image formation so that the light is collected onto a light sensor element 142 and translated into pixel data via a photoelectric signal transformation. During assembly of the CISM, the light module 130 and the rod lens array 120 are usually glued onto the housing 110, and the sensor board 140 and the light source guide terminals 136 are welded together. With reference to FIG. 2, in the prior art assembly process for the sensor board 140, a thermal melting rod 112 disposed on the bottom of the housing 110 is placed through a hole 144 on the sensor board 140, and the thermal melting rod 112 is deformed by a hot press process to combine together the housing 110 and the sensor board 140. Please refer to FIG. 3. FIG. 3 is a schematic drawing for combining together the sensor board 140 and the light source guide terminals 136 in the prior art image reading apparatus. The light source guide terminals 136 are placed through the sensor board 140, and the two are welded together to form an electrical connection.

However, after completing the assembly process for the CSIM, if the module is of poor quality and one of the elements needs to be replaced or reworked, the above-mentioned welding and gluing bonding methods make it difficult to disassemble the elements and may lead to damage to the original elements, which wastes resources and leads to higher costs. Furthermore, the welding and gluing bonding methods require an extra welding and gluing process and related materials, which again increase both the complexity and costs. Moreover, in order to cure the bonding glue for subsequent processes, the module may need to be air dried or baked, which also increases the manufacture time and costs. When the sensor board 140 must be changed, the thermal melting rod 112 on the housing 110 needs to be broken, which may cause damage to the housing 110 and to other combined elements.

Therefore, it is desirable to provide an image reading apparatus which is designed for easy assembly and disassembly, which reduces manufacturing costs and reworking costs, and which also recycles materials to mitigate and/or obviate the aforementioned problems.

SUMMARY OF THE INVENTION

A main objective of the present invention is to provide an image reading apparatus which is designed for easy assembly and disassembly, which reduces manufacturing costs and reworking costs, and which also recycles materials.

In order to achieve the above mentioned objective, an image reading apparatus of the present invention comprises a housing, a rod lens array, a light module and a sensor board. The rod lens array, the light module and the sensor board are all attached to the housing. The sensor board comprises a plurality of light sensor chips. The light module comprises a light guide, a light source and guide terminals extending from the light source. The guide terminals are electrically connected to the sensor board with resilient contacts. The light source and the light guide of the image reading apparatus are individual elements and are combined together with a detachable fastening mechanism. The light source and the light guide are separately attached to the housing and then combined together.

The housing of the image reading apparatus further comprises a plurality of first fastening elements and second fastening elements, which are used to fasten the rod lens array and the light module to the housing. Furthermore, the housing further comprises several sets of thermal melting spots that are thermally plastic, and the sensor board is adapted to be fixed to the housing by hot pressing the plurality of thermal melting spots.

Other objectives, advantages, and novel features of the invention will become more apparent from the following detailed description when taken in conjunction with the accompanying drawings.

DETAILED DESCRIPTION OF THE PREFERRED EMBODIMENT

Figure 4:
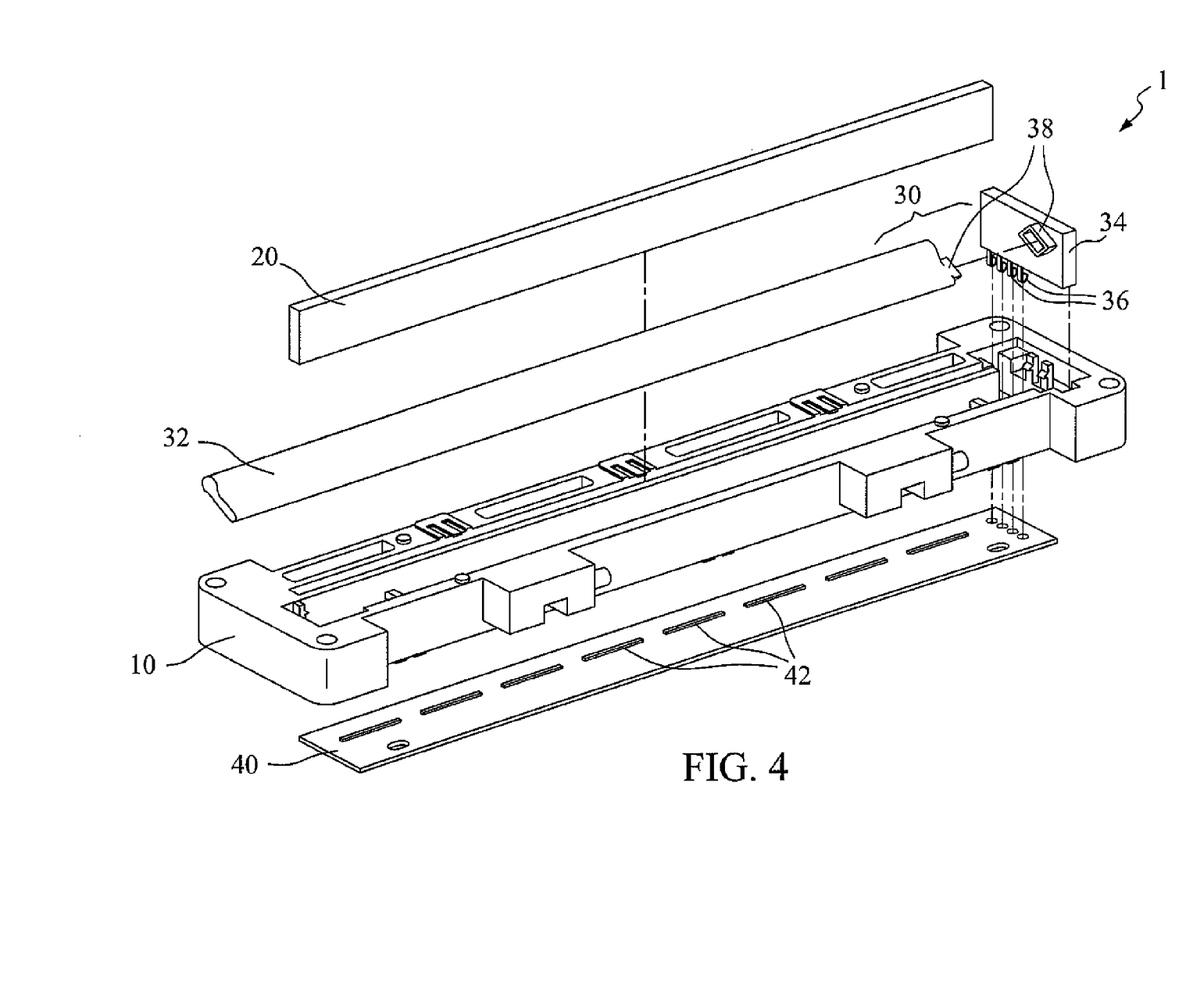
FIG. 4 is an exploded view of an image reading apparatus according to the present invention.

Please refer to FIG. 4. FIG. 4 is an exploded view of an image reading apparatus according to the present invention. As shown in FIG. 4, an image reading apparatus 1 of the present invention comprises a housing 10, a rod lens array 20, a light module 30 and a sensor board 40. The rod lens array 20, the light module 30 and the sensor board 40 are all attached to the housing 10. The sensor board 40 comprises a plurality of light sensor chips 42. The light module 30 comprises a light guide 32, a light source 34 and guide terminals 36 extending from the light source 34. The guide terminals 36 are electrically connected to the sensor board 40 with resilient contacts. The sensor board 40 or the light module 30 may be easily detached by resilient contacts of the guide terminals 36, and the image reading apparatus 1 may eliminate the welding process between the guide terminals 36 and the sensor board 40 to reduce manufacturing costs.

The light source 34 and the light guide 32 of the image reading apparatus 1 are individual elements and are combined together with a detachable fastening mechanism 38. The light source 34 and the light guide 32 are separately attached to the housing 10 and then combined together. The light source 34 and the light guide 32 in the image reading apparatus 1 are detachable. Therefore, if either of the light source 34 or the light guide 32 is defective, there is no need to change the entire light module 30, which saves resources and so reduces costs. In this embodiment, the light guide 32 is a specific type of light guide, but other types of light guides capable of providing the same effect are also suitable.

Figure 5A:
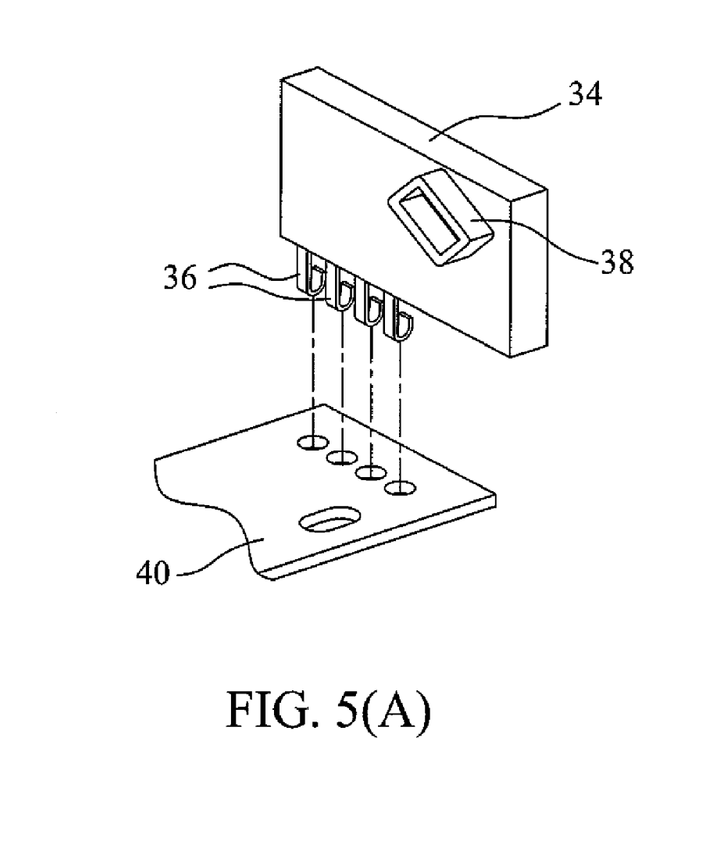
FIGS. 5(A) and 5(B) are schematic drawings of combining together a sensor board and light source guide terminals in an image reading apparatus of the present invention.
Figure 5B:
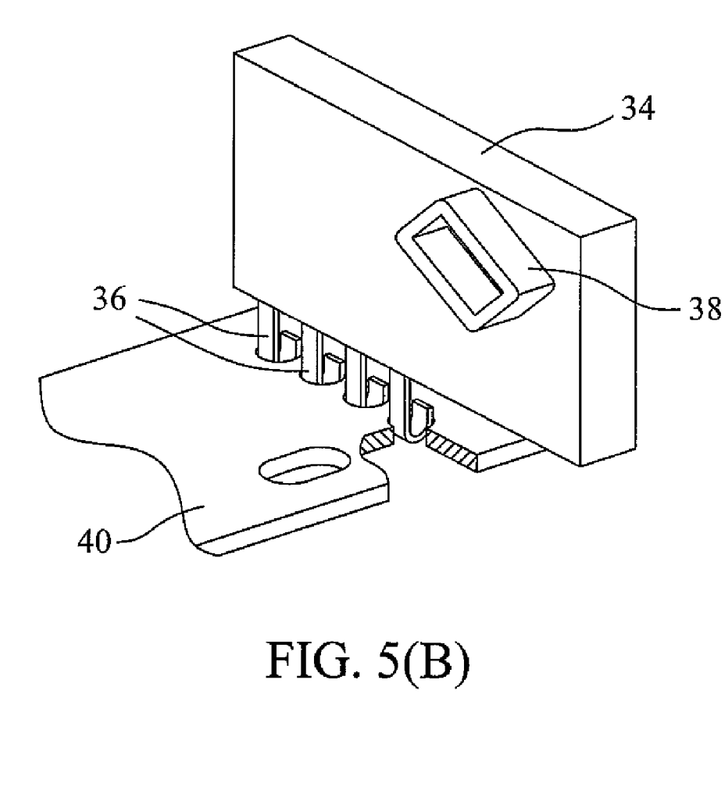

Please refer to FIGS. 5(A) and 5(B). FIGS. 5(A) and 5(B) are schematic drawings that illustrate combining together the sensor board 40 and the guide terminals 36 in the image reading apparatus 1 of the present invention. As shown in FIGS. 5(A) and 5(B), the guide terminals 36 of the image reading apparatus 1 are inverted hook-shaped leaf springs. When the guide terminals 36 are passed through the sensor board 40 and with the elastic force from the guide terminals 36, the guide terminals 36 automatically connect to the sensor board 40. Alternatively, one need only to pull on the guide terminals 36 to disconnect the sensor board 40 from the guide terminals 36. Although in this embodiment the guide terminals 36 are inverted hook-shaped leaf springs, other equivalent guide terminals 36 are also suitable.

Figure 6:
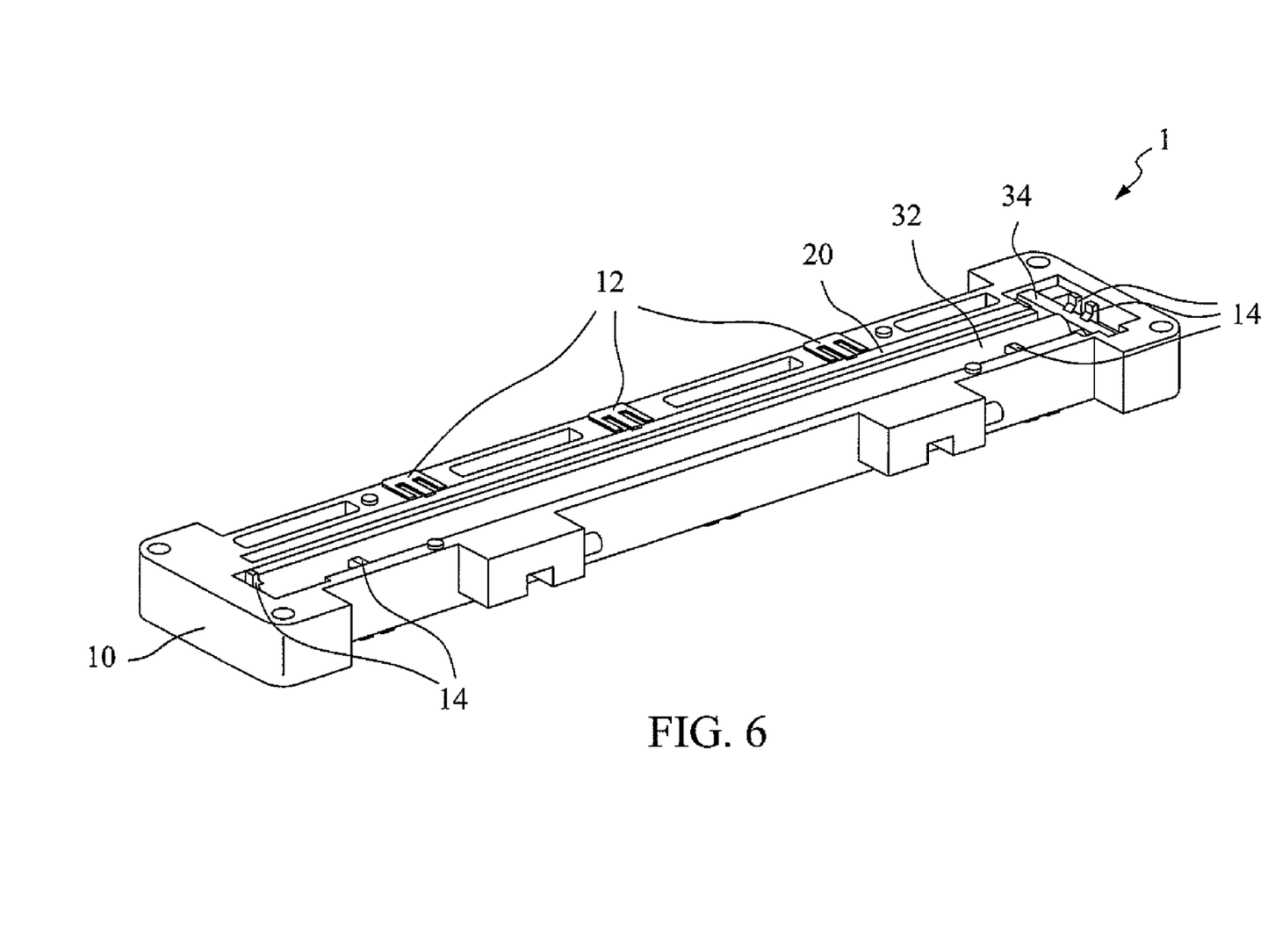
FIG. 6 is a front perspective view of an image reading apparatus of the present invention.

Please refer to FIG. 6. FIG. 6 is a front perspective view of an image reading apparatus 1 of the present invention. As shown in FIG. 6, the housing 10 of the image reading apparatus 1 further comprises a plurality of first fastening elements 12 and second fastening elements 14, which are used to fasten the rod lens array 20 and the light module 30 to the housing 10. The rod lens array 20 and the light module 30 are not glued onto the housing 10. Therefore, there is no need to wait for glue to cure, and the related difficulties of reworking the elements are avoided. For example, if the rod lens array 20 needs to be changed, just pulling on the plurality of first fastening elements 12 removes the rod lens array 20 from the housing 10. Similarly, when the light guide 32 or the light source 34 of the light module 30 needs to be changed, simply pulling the plurality of second fastening elements 14 removes them from the housing 10.

Figure 7:
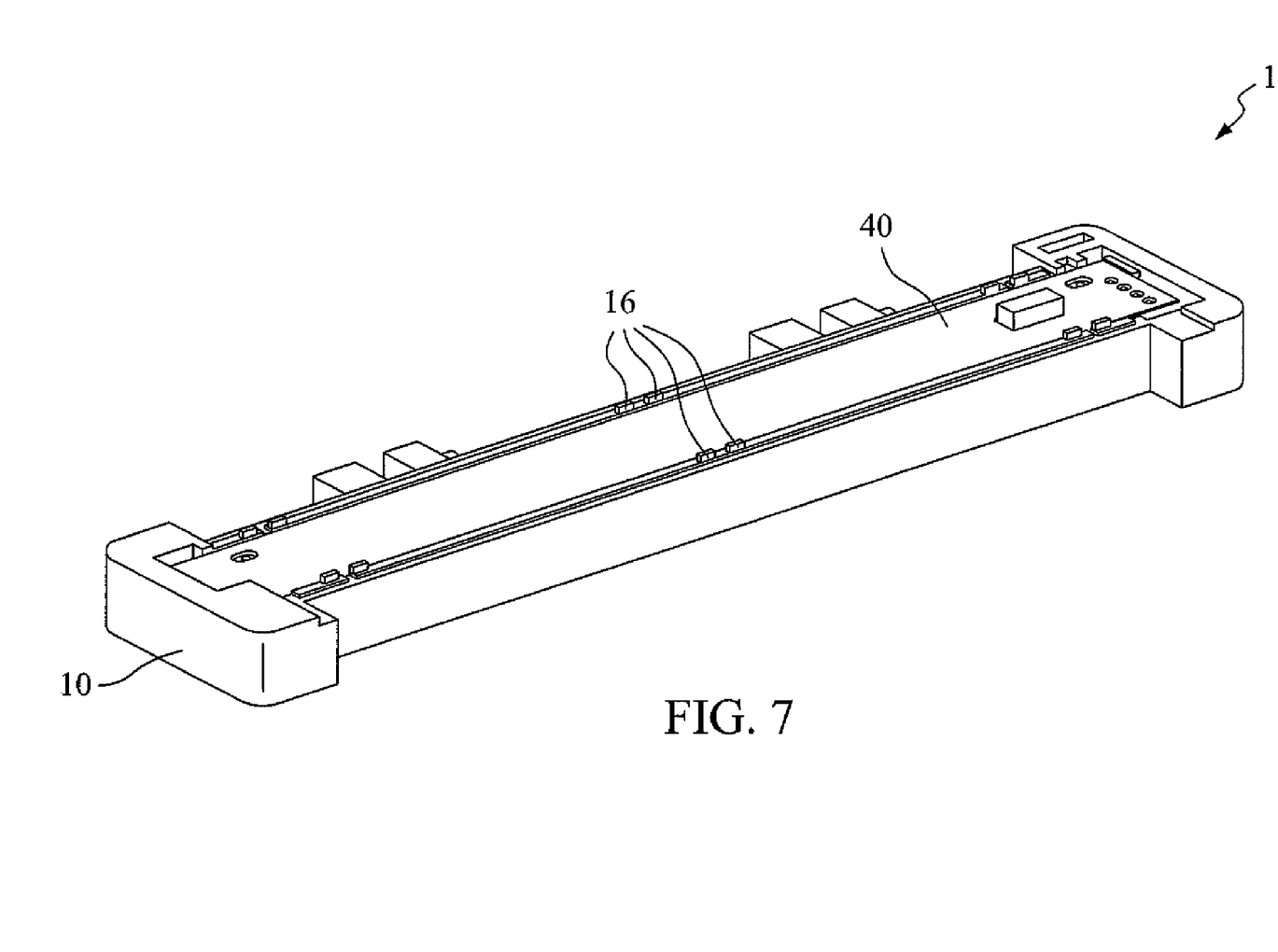
FIG. 7 is a rear perspective view of an image reading apparatus of the present invention.
Figure 8A:
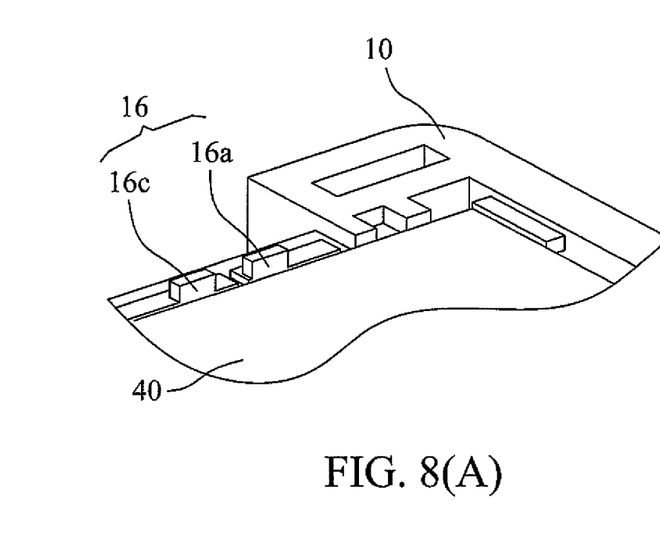
FIGS. 8(A) and 8(B) are schematic drawings of an image reading apparatus of the present invention using a plurality of thermal melting spots.
Figure 8B:
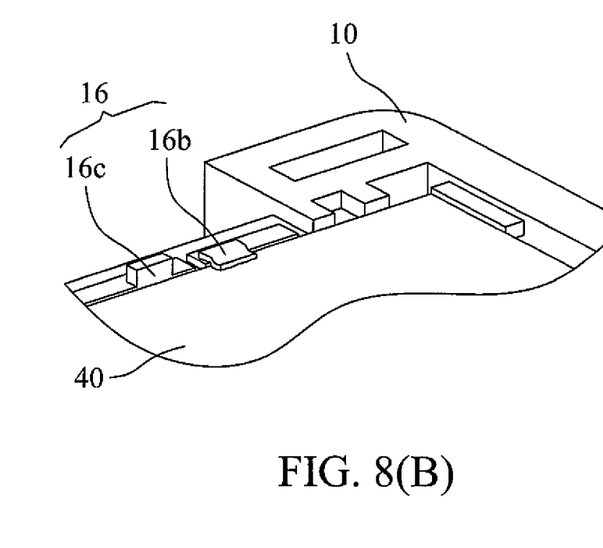

Please refer to FIG. 7 and FIGS. 8(A) and 8(B). FIG. 7 is a rear perspective view of an image reading apparatus 1 of the present invention. FIGS. 8(A) and 8(B) are schematic drawings of an image reading apparatus 1 of the present invention employing a plurality of thermal melting spots. The housing 10 of the image reading apparatus 1 further comprises several sets of thermal melting spots 16 having thermal plasticity. The sensor board 40 can be fixed to the housing 10 by hot pressing the target thermal melting spots 16a to form a thermal melting fastening mechanism 16b. Only one of each set of thermal melting spots 16 is used for fastening the sensor board 40, while other thermal melting spots 16 are backup thermal melting spots 16e. In the image reading apparatus 1 of the present invention, if it becomes necessary to rework or to change the sensor board 40, only the thermal melting fastening mechanism 16b needs to be broken. After the sensor board 40 has been changed, the backup thermal melting spots 16c may be hot pressed to fasten the new sensor board 40 to the housing 10. Therefore, the housing 10 is reusable, unlike the prior art technology in which the entire housing and other attached elements thereon are not reusable after disassembly.

The image reading apparatus 1 of the present invention uses leaf springs and fastening structures to improve the disassembly-related problems in the prior art technology and, therefore, reduces manufacturing costs and reworking costs and also improves the recycling of materials.

Although the present invention has been explained in relation to its preferred embodiment, it is to be understood that many other possible modifications and variations can be made without departing from the spirit and scope of the invention as hereinafter claimed.

What is claimed is:

1. An image reading apparatus comprising:
   a housing comprising several sets of thermal melting spots that are thermal plastic;
   a rod lens array attached to the housing;
   a light module attached to the housing and including a light guide, a light source and guide terminals extending from the light source, with the guide terminals being leaf springs; and
   a sensor board attached to the housing and comprising a plurality of light sensor chips, wherein the sensor board is adapted to be fixed to the housing by hot pressing the sets of thermal melting spots; and
   wherein the guide terminals are electrically connected to the sensor board with resilient contacts.

2. The image reading apparatus as claimed in claim 1, wherein only one of each set of the thermal melting spots is used for the sensor board.

3. The image reading apparatus as claimed in claim 1, wherein the housing comprises a plurality of first fastening elements fastening the rod lens array to the housing.

4. The image reading apparatus as claimed in claim 3, wherein only one of each set of the thermal melting spots is used for the sensor board.

5. The image reading apparatus as claimed in claim 1, wherein the housing further comprises a plurality of fastening elements fastening the light module to the housing.

6. The image reading apparatus as claimed in claim 5, wherein only one of each set of the thermal melting spots is used for the sensor board.

7. An image reading apparatus comprising:
   a housing;
   a rod lens array attached to the housing;
   a light module attached to the housing and including a light guide, a light source and guide terminals extending from the light source, with the guide terminals being leaf springs, wherein the light source and the light guide are connected together with a detachable fastening mechanism; and
   a sensor board attached to the housing and comprising a plurality of light sensor chips, wherein the guide terminals are electrically connected to the sensor board with resilient contacts.

8. The image reading apparatus as claimed in claim 7, wherein the housing comprises several sets of thermal melting spots that are thermal plastic, and wherein the sensor board is adapted to be fixed to the housing by hot pressing the sets of thermal melting spots.

9. The image reading apparatus as claimed in claim 8, wherein only one of each set of the thermal melting spots is used for the sensor board.

10. The image reading apparatus as claimed in claim 7, wherein the light source and the light guide are separately attached to the housing and then combined together thereon.

11. The image reading apparatus as claimed in claim 7, wherein the housing comprises a plurality of first fastening elements fastening the rod lens array to the housing.

12. The image reading apparatus as claimed in claim 11, wherein the housing further comprises a plurality of second fastening elements for fastening the light module to the housing.

13. The image reading apparatus as claimed in claim 12, wherein the housing further comprises several sets of thermal melting spots that are thermal plastic, and wherein the sensor board is adapted to be fixed to the housing by hot pressing the sets of thermal melting spots.

14. The image reading apparatus as claimed in claim 13, wherein only one of each set of the thermal melting spots is used for the sensor board.

15. An image reading apparatus comprising:
a housing;
a rod lens array attached to the housing,
a light module attached to the housing and including a light guide, a light source and guide terminals extending from the light source, with the guide terminals being leaf springs, wherein the guide terminals are inverted hook-shaped leaf springs; and
a sensor board attached to the housing and comprising a plurality of light sensor chips, wherein the guide terminals are electrically connected to the sensor board with resilient contacts.

16. The image reading apparatus as claimed in claim 15, wherein the housing comprises several sets of thermal melting spots that are thermal plastic, and the wherein sensor board is adapted to be fixed to the housing by hot pressing the sets of thermal melting spots.

17. The image reading apparatus as claimed in claim 16, wherein only one of each set of the thermal melting spots is used for the sensor board.

* * * * *